United States Patent Office 3,567,803
Patented Mar. 2, 1971

3,567,803
PREPARATION OF VINYL PHOSPHATES
Loyal F. Ward, Jr., Modesto, Calif., Donald D. Phillips, Westfield, N.J., and Richard R. Whetstone, Modesto, Calif., assignors to Shell Oil Company, New York, N.Y.
No Drawing. Continuation-in-part of application Ser. No. 302,446, Aug. 15, 1963. This application July 27, 1967, Ser. No. 656,366
Int. Cl. A01n 9/36; C07f 9/08
U.S. Cl. 260—972
19 Claims

ABSTRACT OF THE DISCLOSURE

Process for preparing insecticidal enol esters of acids of pentavalent phosphorus by reacting a halide of an acid of pentavalent phosphorus with an alpha-haloketone in the presence of a base.

---

This application is a continuation-in-part of copending application Ser. No. 302,446, filed Aug. 15, 1963, now abandoned.

This invention relates to a novel process for the preparation of insecticidal enol esters of acids of pentavalent phosphorus. More specifically, the invention relates to such a process wherein a middle halide of an acid of pentavalent phosphorus is reacted with an alpha-haloketone in the presence of a strong base to produce the corresponding enol ester of the acid of pentavalent phosphorus.

It has been found that enol esters of acids of pentavalent phosphorus represented by the formula

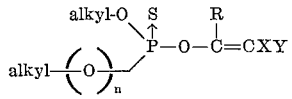

wherein $n$ is 0 or 1, R is halo-substituted phenyl, Y is halogen with an atomic weight of not more than 80, X is hydrogen or Y, are very ecective insecticides for controlling ectoparasites of animals, and insects which dwell in soil, as well as having a broad spectrum of insecticidal activity.

Attempts to prepare them by known methods, such as the so-called Perkow Synthesis, have not been successful. However, it now has been found that these, and other related enol esters of acids of pentavalent phosphorus are readily prepared by the reaction of a middle halide of an acid of pentavalent phosphorus with an alpha-haloketone in the presence of a strong base, the reaction proceeding according to the equation:

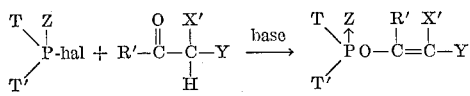

wherein T represents the alkoxy radical "alkyl—O—," T represents the alkyl or alkoxy radical,

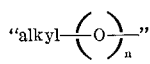

wherein the $n$ is 0 or 1 and the X' represents the hydrogen or Y represented by X, hal represents a middle halogen, chlorine or bromine, preferably chlorine, Z represents sulfur, and R' represents the halo-substituted phenyl radical, R. These compounds wherein the beta carbon atom of the vinyl ester group is mono-substituted or is di-substituted by two different substituents, i.e., asymmetrically di-substituted, can exist in the form of two geometric isomers. The reaction is carried out in the liquid phase, preferably in a suitable solvent. The process according to this invention results in the production of an insecticidally active isomer.

Further, it has been found that this reaction is a general reaction, extending to the preparation of compounds wherein Z represents oxygen and T represents an organic radical bonded directly to the phosphorus atom as well as bonded thereto via an oxygen atom, suitable organic radicals including hydrocarbon, hydrocarbonoxy, amino($NH_2$), hydrocarbylamino(THN—), and dihydrocarbylamino(TTN—). So, also, the process can prepare such compounds wherein T' is an organo radical of the group represented by T, wherein R' is an aromatic radical other than halo-substituted phenyl, or a heterocyclic radical. The process thus is useful for the preparation of valuable insecticides of the kind disclosed in U.S. Pat. No. 2,908,605, wherein X' would represent an amido radical.

The organic groups represented by T and T' can each be a lower hydrocarbon group, that is, of low molecular weight, not exceeding about 10 carbon atoms in the group. Such hydrocarbon groups may be of either aliphatic or cyclic or mixed configuration; they may be saturated, olefinically unsaturated or aromatically unsaturated; preferably they are free from acetylenic unsaturation. The aliphatic groups may be of straight chain, or of branch-chain configuration. The aromatic groups preferably are mononuclear. Thus, suitable organic groups include both straight-chain and branch-chain alkyls, such as methyl, ethyl, n- and isopropyl, n-, sec-, and tert-butyls, the various isomeric $C_5$, $C_6$ and the like alkyl groups, cycloalkyl, such as the cyclopentyl, cyclohexyl, methylcyclohexyl, dimethylcyclooctyl, 3,5,5-trimethylcyclohexyl, and the like cyclo alkyl groups, aryl, such as the phenyl group, alkaryl, such as the methylphenyl, ethylphenyl, and the like aryl groups, aralkyls, such as the benzyl, phenethyl, and like aralkyl groups, alkenyl, such as the allyl, crotyl and like groups, alkadienyl, such as the butadienyl, pentadienyl and like alkadienyl groups, and mixed groups such as the vinylphenyl, allylphenyl, phenylvinyl, phenylcrotyl, phenylallyl groups and the like. Preferred compounds are those wherein the T and/or T' represents an alkyl or alkoxy group of from 1–4 carbon atoms, with most preferred compounds being those wherein T and/or T' are methyl, methoxy, or ethoxy.

R' includes substituted aromatic or heterocyclic radicals, the aromatic radical, preferably of 6–18 carbon atoms being substituted with from one to three radicals, preferably middle halogens, i.e., chlorine or bromine and preferably chlorine, cyano, hydroxy, alkoxy of 1–4 carbon atoms, amino and the like, while the heterocyclic radicals containing from 5 to 6 members in the ring, one of which is oxygen, sulfur or nitrogen, the remainder being carbon, which exhibit the chemical properties of aromatic compounds, such as benzene. Also included are those compounds in which the hetero ring is fused with a carbocyclic ring. The hetero ring is in all cases bonded to the indicated carbon atom by a bond to a carbon atom of the ring. Typical heterocyclic radicals of this kind include the radicals derived from furan, thiophene, pyrrole, pyridine, quinoline, isoquinoline, indole, thionaphthene, and the like and their partial or completely hydrogenated derivatives.

Compounds of highest insecticidal activity result when the R' is a middle halogen substituted mononuclear radical, especially halophenyl. The subgenus of particular interest includes the phenyl radical wherein from one to three radicals, preferably middle halogens, i.e., chlorine and bromine, and preferably chlorine, are substituted thereupon.

Although it is most preferred that X' be hydrogen or a halogen with an atomic weight of not more than 80, X' can also be the group,

wherein R'' can be an alkyloxy, phenyloxy, benzyloxy, dialkylbenzoxy, or an amino

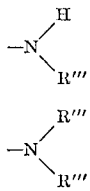

wherein R''' is an alkyl group of 1–6 carbon atoms.

As the halogen-substituted carbonyl compound there may be employed any halogen-substituted aldehyde or ketone containing at least one but not more than 2 atoms of a halogen, at least one of which is preferably chlorine directly substituted on a single carbon atom in the alpha position to the ketonic or aldehydic carbonyl group. The preferred alpha-haloacetophenones are those wherein the halo group is chlorine.

Compounds classified as alpha-haloacetophenones are exemplified by the following: 2,2,2',4'-tetrachloroacetophenone, 2,2,2',5'-tetrachloroacetophenone, 2,2-dichloro-2',4'-dibromacetophenone, 2,2,2'-trichloro - 4' - bromoacetophenone, ,2-dichloroacetophenone, 2,2,2',4',5'-pentachloroacetophenone, 2,2,2',5'-tetrachloro-4' - bromoacetophenone, 2-chloro-2-phenoxyacetophenone, 2,2-dichloro-4'-(methylthio)acetophenone, 2,2,5'-trichloro-2' - nitroacetophenone, 2,5-dichloro - 3(dichloroacetyl)thiophene, 2,2',4' - trichloroacetophenone, 2,2',5'-trichloroacetophenone, 2-chloro - 2',4' - dibromoacetophenone, 2,2',4',5'-tetrachloroacetophenone, 2 - chloro - 2 - (dimethylcarbamoyl)acetophenone, 2,2-dibromo-2',4' - dichloroacetophenone, 2-bromo-2,2',4'-trichloroacetophenone, 2-fluoro-2,2',4'-trichloroacetophenone, 2-bromo - 2 - fluoro-2',4'-dichloroacetophenone, 2,2-difluoro-3-chloroacetophenone, and the like.

Examples of the middle halide acids of pentavalent phosphorus useful in the novel reaction of this invention include O,O-dimethyl phosphorochloridothioate, dimethyl phosphorochloridate, dimethyl phosphorobromidate, methyl methylphosphonochloridothioate, O,O - diethyl phosphorobromidothioate, O,O - dipropyl phosphorochloridothioate, O,O-dipropyl phosphorobromidothioate, diethyl phosphorochloridate, diethyl phosphorobromidate, dibutyl posphorochloridate, dipropyl phosphorobromidate, dipropyl phosphorochloridate, O-methyl ethylphosphonochloridothioate, O-methyl ethylphosphonobromidothioate, O-ethyl ethylphosphonochloridothioate ethyl ethylphosphonobromidate, ethyl ethylphosphonochloridate, butyl propylphosphonochloridate, butyl butylphosphonochloridate, O,O-dibutyl phosphorochloridothioate, dibutyl phosphorobromidate, O,O-dibutyl phosphorobromidothioate, and the like.

Preferred middle halide acids are the O,O-dialkyl phosphorohalidothioates wherein each alkyl group contains from 1–4 carbon atoms.

Suitable strong bases include the alkali metal alkoxides, preferably the lower alkoxides containing 1–4 carbon atoms, such as sodium methoxide, potassium methoxide, sodium ethoxide, potassium butoxide, and the like, and the alkali metal hydrides such as sodium hydride, potassium hydride and the like.

The reaction of the appropriate alpha-haloacetophenone with the appropriate phosphorus acid halide in the presence of a base is conveniently carried out by mixing about equal molar amounts of the reactants and base together in a suitable solvent. While the order of addition of the base, ketone and phosphorus acid halide is not critical to the novel reaction of this invention, a convenient and effective, and therefore, preferred procedure, is to thoroughly mix the ketone and base together in a solvent prior to the addition of the phosphorus acid halide. The process can be carried out batchwise, semicontinuously or continuously.

The phosphorus acid halide and alpha-haloacetophenone usually are employed in about equimolar quantities, although lesser amounts of the carbonyl compound may be employed. A broad applicable range of mole ratios between the reactants is 10:1 to 1:1, with the preferred range being 2:1 to 1:1.

The presence of about one mole of the strong base per mole of acetophenone is necessary for the reaction to proceed effectively. Suitable amounts of base include 0.8 to 3.0 moles per mole of the acetophenone employed, the most preferred range being 0.9 to 1.1 moles.

Suitable reaction conditions for the preparation of the enol esters contemplated by this invention include temperatures in the general range of −10° C. to 100° C., although temperatures down to about −50° C. and above 100° C. are also satisfactory. When the preferred order of addition is practiced, it is preferable to mix the base and ketone at the lower temperatures, i.e., at about −10° C. to −50° C. and continue the reaction with the phosphorus acid halide at higher temperatures of about 25° C. to 80° C.

It is generally advantageous to carry out the reaction in an inert atmosphere, i.e., nitrogen or argon, and in an anhydrous state. The time required for completion of the reaction is in most cases relatively short, e.g., 10 minutes to an hour or two, although the reaction time can be varied as required, and a reaction time of from 1–10 hours is generally satisfactory with a duration of from 2–5 hours being generally sufficient.

Suitable solvents for the reaction include liquid saturated aliphatic hydrocarbons such as hexane and liquid aromatic hydrocarbons such as toluene. The lower dialkyl ethers, especially diethyl ether, are usually to be preferred. The concentration of solvent can vary within a wide range but should be sufficient to create a readily fluid reaction mixture, and can be employed most advantageously with a ratio of one volume of solvent per volume of reactants, although a range of ¾ to 1½ volumes per volume of reactants is entirely satisfactory.

The product is suitably recovered by filtering the final crude reaction mixture, removing the solvent, then crystallizing the product from a suitable solvent, such as pentane.

The preferred halogenated acetophenones of this invention can be prepared by halogenating the appropriate acetophenones. Alternatively, the alpha-haloacetophenones can be prepared by an orthodox Friedel-Crafts ketone synthesis (described generally in Fieser and Fieser, "Organic Chemistry," second edition, 1950, at pages 576–7), by reacting the appropriate halobenzene with the appropriate polyhaloacetyl chloride in the presence of aluminum chloride, then decomposing the resulting complex with ice and hydrochloric acid.

The polyhalobenzenes are a well-known class of compounds, (Lange's handbook) as are the polyhaloacetyl chlorides (Huntress, "Organic Chloride Compounds," Wiley, 1948).

The reaction is carried out as described in Fieser and Fieser—that is, the aluminum chloride is mixed first with a polyhalobenzene, then with the polyhaloacetyl chloride, ordinarily at room temperature, the mixture is allowed to heat or is heated to about 80–100° C., maintained at that temperature for a sufficient time to complete the formation of the complex, then the mixture is cooled and treated with an ice-hydrochloric acid mixture to decompose the complex and separate water soluble aluminum salts. About one mole of the acetyl chloride is used per mole of the polyhalobenzene, and ordinarily it will be found advantageous to use about 10% excess of aluminum chloride, or about 1.1 moles per mole of polyhalobenzene.

Where polyhalobenzene is liquid at room temperature usually no added solvent will be required. Where the polyhalobenzene is solid at room temperature, or it is desired to maintain a more fluid mixture than can be obtained with a liquid polyhalobenzene alone, a solvent may be added, suitable solvents including carbon disulfide, nitrobenzene, nitromethane, and the like.

The ketone product ordinarily is most effectively and conveniently recovered by treating the mixture obtained on decomposition of the complex with a suitable solvent, e.g., ether, separating the organic phase from the aqueous phase, stripping the solvent from the organic phase, then distilling the residue to get the ketone product.

The following specific examples of the invention will serve to illustrate more clearly the application of the invention, but it is not to be construed as in any way limiting the invention thereto. The volume and weight relations are the same as the relation of the liter to the kilogram.

EXAMPLE I (A) To 294 parts by weight of aluminum chloride was added 393 parts by weight of 1,2,4-trichlorobenzene. To this slurry, stirred, was added dropwise over a period of 1.75 hours 248.6 parts by weight of chloroacetyl chloride. The mixture then was slowly heated to 100° C. and held at that temperature for 2 hours, with continuous stirring. Decomposition of the resulting complex was effected by pouring the reaction mixture onto a mixture of ice and hydrochloric acid. The resulting mixture was mixed with methylene chloride, and the phases were separated. The organic phase thus obtained was washed successively with dilute hydrochloric acid, water, dilute sodium bicarbonate solution and finally with saturated salt (NaCl) solution. It was then dried and the methylene chloride was stripped. The residue was taken up in anhydrous ether and the solution was chilled to crystallize 2.2′,4′,5′-tetrachloroacetophenone (melting point: 62.5–63° C.), which was purified by recrystallization from pentane. The identity of the product was established by elemental analysis and infra-red spectrum analysis.

(B) 7.45 parts by weight of sodium hydride was mixed with 100 parts by volume of ether, and to this over a period of 15 minutes was added 31.1 parts by weight of diethyl phosphorochloridothionate. 40 parts by weight of 2,2′,4′,5′-tetrachloroacetophenone in 200 parts by volume of ether was added, with thorough mixing, over a 2.5 hour period, while heating at reflux 35–36° C. The mixture then was refluxed for an additional 4.5 hours. The mixture was filtered, then the ether was removed by distillation and the residue was extracted with pentane. The product was purified by recrystallization from the pentane. The product (melting point 55–56° C.) was identified as O,O-diethyl O-(2-chloro-1-(2,4,5-trichlorophenyl)vinyl phosphorothioate by elemental analysis.

Elemental analysis (percent by weight).—Calculated: P, 7.56; Cl, 34.7; S, 7.8. Found: P, 7.7; Cl, 35.0; S, 7.4.

The identity of the product was confirmed by infra-red spectrum analysis.

(C) In a similar manner, using dimethyl phosphorochloridothionate, there was prepared O,O-dimethyl O-(2-chloro - 1 - (2,4,5-trichlorophenyl)vinyl phosphorothioate, melting point 75–76° C.

EXAMPLE II 65 parts by weight of 2,2′,4′-trichloroacetophenone and about 450 parts by volume of anhydrous ether were added over a 1-hour period to a suspension of sodium hydride and 100 parts by volume of anhydrous ether at 25–35° C. The sodium hydride was obtained as a 50% dispersion in mineral oil and was washed twice with 150 parts by volume of anhydrous ether to remove the bulk of mineral oil. The mixture then was stirred for 2 hours, at which point hydrogen evolution had ceased. Dimethyl phosphorochloridate was added in the amount of 50.4 parts by weight over a 30-minute period at 25–30° C. with cooling as needed. The mixture was heated under reflux to 37° C. for 2 hours, washed successively with water-dilute sodium bicarbonate solution. The mixture was then dried, the solvent removed and the residue was treated with ether-pentane. The resulting residue was 52 parts by weight of a very pale yellow solid melting point 69–70° C. The residual liquids contained 28 more parts by weight of 2-chloro-1-(2,4-dichlorophenyl)vinyl dimethyl phosphate. The yield was about 65%. The identity of the product was confirmed by elemental analysis and infra-red spectrum analysis.

EXAMPLE III 6 parts by weight of sodium hydride was a 50% suspension in mineral oil was washed twice with 100 parts by volume of dry ether to remove the oil and then covered with 100 parts by volume of dry ether. O,O-diethyl phosphorochloridothioate was added in the amout of 56.5 parts by weight and to this mixture 2,2′,4′-trichloroacetophenone in the amount of 56 parts by weight in 200 parts by volume of dry ether was added over a 3¾ hours period. Temperature was allowed to rise spontaneously to 31° C. The mixture was stirred for 15 minutes and heated under reflux at 37° C. for 1½ hours. The resultant mixture was cooled, filtered and stripped to remove ether. The residual red-brown liquid (114 grams) was poured into about 500 parts by volume of pentane to precipitate a dark brown polymeric material. This was separated by filtering through Celite. The pentane solution was treated with charcoal and stripped to 90° C. (kettle temperature)/0.05 torr. in a small Claisen still. There remained 69 parts by weight (74%) of crude O-(2-chloro - 1 - (2,4-dichlorophenyl)vinyl)O,O-diethyl phosphorothioate as a dark orange liquid which slowly crystallized. The identity of the product was confirmed by elemental analysis and infra-red spectrum analysis.

EXAMPLE IV

By the procedure described in Example III above 35 parts by weight of 2-chloro-2′,4′-dibromoacetophenone and 21.5 parts by weight of O,O-dimethyl phosphorochloridothioate was reacted, resulting in 25 parts by weight (51%) of O-(2 - chloro-1-(2,4-dibromophenyl)vinyl)O,O-dimethyl phosphorothioate as a white solid with a melting point of 55–56° C.

Analysis (percentage by weight).—Calculated for $PSO_3Br_2ClC_{10}H_{10}$: P, 7.1; Cl, 8.1; Br, 36.7. Found: P, 7.3; Cl, 8.8; Br, 35.4.

EXAMPLE V

A mixture of 5.4 parts by weight of sodium methoxide and 22.3 parts by weight of 2,2′,4′-trichloroacetophenone in 150 parts by volume of cold ether ($<0°$) was added, with stirring, to 50 parts by weight of O,O-diethyl phosphorochloridothioate heated at 60–75° C.; time of addition, 3 hours. After an additional hour of heating, the mixture was worked up and the product was obtained as an orange liquid which crystallized almost completely upon standing at room temperature. Recrystallization from pentane gave a 68% yield of O-(2-chloro-1-(2,4-dichlorophenyl)vinyl)O,O-diethyl phosphorothioate, as a pale yellow solid with a melting point of 47–48° C. The identity of the product was confirmed by elemental analysis and infra-red spectrum analysis.

EXAMPLE VI

By the procedure described in Example V above diethyl phosphorochloridate in the amount of 100 parts by weight was treated with a mixture of 2,2′4′-trichloroacetophenone (44.6 parts by weight), sodium methoxide (10.8 parts by weight) and ether (total 210 parts by volume). The crude product was obtained as an orange liquid, 67 parts by weight (93% yield). Infra-red spectrum analysis confirmed the identity of the product as 82% of 2-chloro-1-(2,4-dichlorophenyl)vinyl diethyl phosphate with ca. 77% being in the beta-form and ca. 5% in the alpha-form.

EXAMPLE VII 112 parts by weight of 2,2',5'-trichloroacetophenone was added, with stirring, to a −30° C. mixture of 28.5 parts by weight of sodium methoxide in 500 parts by volume of toluene. The temperature was raised to 0° C. and 104 parts by weight of O,O-diethyl phosphorochloridothioate was added in small portions at first and then all at once. The mix was heated to 25° C. The temperature rose slowly to 47° C. over a period of 2 hours, the contents darkened and the solids went into solution. The contents were filtered and stripped to remove the toluene. The contents were then taken up in 300 parts by volume of hexane, washed with 2× 300 parts by volume of water, dried over MgSO₄, stripped on a rotary evaporator and finally through a Claisen still at 125° C./0.1 torr. A viscous dark residue remained. The identity of the product, O,O-diethyl O-(2-chloro-1-(2,5-dichlorophenyl)vinyl phosphorothioate, was confirmed by infra-red spectrum analysis.

EXAMPLE VIII 112 parts by weight of 2,2',5'-trichloroacetophenone along with 50 parts by volume of toluene containing 5% by volume of O,O-diethyl phosphorochloridothioate was added to a −50° C. mixture of 38.5 parts by weight of sodium methoxide in 600 parts by volume of toluene containing 5% by volume of O,O-diethyl phosphorochloridothioate. The mixture was swirled and brought to 5° C. The mixture, which became a clear brown solution, was then added in approximately 30 parts by volume portions over a period of 2 hours to 189 parts by weight of O,O-diethyl phosphorochloridothioate. The O,O-diethyl phosphorochloridothioate was at about 75° C. when the above brown solution was added. During the addition the toluene was removed under vacuum at a temperature of 70°–75° C. On completion of the addition, the mixture was stirred and heated for an additional hour, the temperature rising to 130° C. The mixture was cooled, 250 parts by volume water and 300 parts by volume hexane were added and the aqueous and organic phases separated. The organic phase was washed with 1× 250 parts by volume water and dried over anhydrous Na₂SO₄. The mixture was filtered, stripped on a rotary evaporator and the oil finally stripped through a Claisen still to 125° C./0.2 torr. The identity of the product, O,O-diethyl O-(2-chloro-1-(2,5-dichlorophenyl)vinyl phosphorothioate, was confirmed by infra-red spectrum analysis.

We claim is our invention:

1. A process for preparing a compound of the formula:

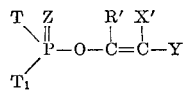

which comprises reacting in the liquid phase a phosphorus acid halide of the formula

with a ketone of the formula

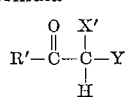

in the presence of a strong base selected from the group consisting of alkali metal hydrides and alkali metal lower alkoxides, in the aforesaid formulae T and T' each independently containing up to 10 carbon atoms and being a member of the group consisting of hydrocarbon and hydrocarbonoxy, the hydrocarbon moiety in each case being free from acetylenic unsaturation, R' is an aromatic radical of 6–18 carbon atoms or substituted aromatic radical of 6–18 carbon atoms having 1–3 substituents selected from the group consisting of halogen, methylthio, nitro, cyano, hydroxy, alkoxy of 1–4 carbon atoms and amino, "hal" represents middle halogen, Z is a member of the group consisting of oxygen and sulfur, Y is middle halogen and X' is a member of the group consisting of hydrogen, middle halogen, phenoxy and dimethylcarbamoyl.

2. The process of claim 1 wherein the reaction is carried out in a solvent.

3. The process of claim 2 wherein the base and ketone of the formula

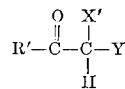

are mixed prior to reaction with the phosphorus acid halide of formula

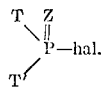

4. The process of claim 1 wherein the phosphorus acid halide has the formula

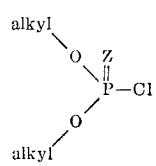

and the ketone has the formula

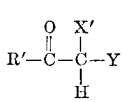

wherein alkyl is alkyl of 1–4 carbon atoms, Z is sulfur or oxygen, R' is chloro- or bromo-substituted phenyl, Y is halogen of atomic weight not greater than 80 and X' is hydrogen or halogen of atomic weight not greater than 80.

5. The process of claim 4 wherein the reaction is carried out in a solvent.

6. The process of claim 5 wherein the base and ketone of the formula

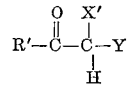

are mixed prior to reaction with the phosphorus acid halide of the formula

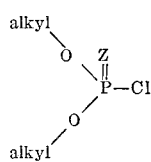

7. The process of claim 5 wherein the base is sodium hydride.

8. The process of claim 5 wherein the base is sodium methoxide.

9. The process of claim 5 wherein the ketone has the formula

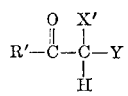

wherein R' is halo-substituted phenyl.

10. The process of claim 9 wherein the phosphorus acid halide is O,O-diethyl phosphorochloridothioate and the ketone has the formula

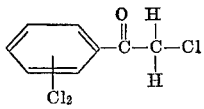

11. The process of claim 10 wherein the base is sodium methoxide.

12. The process of claim 11 wherein the sodium methoxide and ketone of the formula

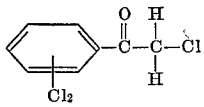

are mixed prior to reaction with the O,O-diethyl phosphorochloridothioate.

13. The process of claim 10 wherein the ketone is 2,2′,4′-trichloroacetophenone.

14. The process of claim 10 wherein the ketone is 2,2′,5′-trichloroacetophenone.

15. The process of claim 14 wherein the base is sodium methoxide and the solvent is toluene.

16. The process of claim 15 wherein the sodium methoxide and 2,2′,5′-trichloroacetophenone are mixed prior to reaction with the O,O-diethyl phosphorochlorodithioate.

17. The process of claim 3 wherein the solvent is toluene.

18. The process of claim 6 wherein the solvent is toluene.

19. The process of claim 12 wherein the solvent is toluene.

References Cited

UNITED STATES PATENTS

| | | | |
|---|---|---|---|
| 2,894,018 | 7/1959 | Lorenz | 260—969 |
| 3,079,417 | 2/1963 | Farrar | 260—957 |
| 3,174,990 | 3/1965 | Ward et al. | 260—972X |

OTHER REFERENCES

Cram et al., "Organic Chemistry," McGraw-Hill, New York (1965), p. 263.

CHARLES B. PARKER, Primary Examiner

A. H. SUTTO, Assistant Examiner

U.S. Cl. X.R.

260—283, 294.8, 326.12, 326.61, 332.5, 346.1, 347.2, 592, 940, 944, 949, 951, 953, 954, 956; 424—200, 202, 203, 210, 211, 215, 217, 218, 219